United States Patent [19]

Planes

[11] Patent Number: 5,338,709
[45] Date of Patent: Aug. 16, 1994

[54] PROCESS FOR PRODUCING GRANULATED STRONTIUM CARBONATE WITH A STRONTIUM-CONTAINING BINDER

[75] Inventor: Gilberto M. Planes, Monterey, Mexico

[73] Assignee: Solvay Barium Strontium GmbH, Hanover, Fed. Rep. of Germany

[21] Appl. No.: 116,770

[22] Filed: Sep. 7, 1993

[30] Foreign Application Priority Data

Sep. 8, 1992 [DE] Fed. Rep. of Germany ....... 4229901

[51] Int. Cl.$^5$ ................................................ C03C 6/00
[52] U.S. Cl. ...................................... 501/27; 501/29; 423/274; 23/313 R
[58] Field of Search ................. 501/27, 29; 423/274; 23/313 R, 313 P

[56] References Cited

U.S. PATENT DOCUMENTS

| | | | |
|---|---|---|---|
| 3,802,901 | 4/1974 | Robertson et al. | 423/274 X |
| 3,875,298 | 4/1975 | Coatney et al. | 423/177 X |
| 3,883,364 | 5/1975 | Robertson et al. | 501/27 X |
| 4,888,161 | 12/1989 | Adams, Jr. et al. | 501/27 X |

Primary Examiner—Karl Group
Attorney, Agent, or Firm—Evenson, McKeown, Edwards & Lenahan

[57] ABSTRACT

A process for producing granulated strontium carbonate in which strontium oxide, strontium hydroxide or hydrated strontium hydroxide, and optionally water, is added as the binder and is granulated and dried simultaneously or in any desired sequence. In a preferred embodiment, the material to be granulated or the granulated material does not come into contact with any inorganic refractory material during any of the process steps. The resulting strontium carbonate obtained according to the process is free of added foreign ions and, in accordance with a preferred embodiment, also free of inorganic refractory materials, and is suitable for use, for example, as the basic material in the manufacture of glass.

16 Claims, No Drawings

PROCESS FOR PRODUCING GRANULATED STRONTIUM CARBONATE WITH A STRONTIUM-CONTAINING BINDER

BACKGROUND OF THE INVENTION

This invention relates to a process for producing granulated strontium carbonate, to the subsequently obtained granulated strontium carbonate and to its use in the glass industry.

In the glass industry, strontium carbonate is used, for example, for the manufacturing of front panes for television sets. In this manner, x-rays from cathode ray tubes may be absorbed.

The production of pure strontium carbonate takes place by means of the precipitation of strontium hydroxides or strontium sulfide with carbon dioxide or carbonates. In the case of this process, powders with very fine particles are obtained which are hard to process. Up to now, the granulation of these powders has normally been carried out by sintering at approximately 800° C. in rotary furnaces. This process is very energy-intensive, and also results in the product becoming contaminated with refractory materials.

U.S. Pat. No. 4,888,161 describes a process for granulating alkaline-earth metal carbonate in which a suspension of the carbonate is produced in water and a quantity of a deflocculating agent which is sufficient for the deflocculating of the carbonate is added, preferably alkali metal salts or ammonium salts of acrylic acid or methacrylic acid or of phosphoric acid or polyphosphoric acid. The liquified suspension will then be dried in a spray drier, and the resulting granulates will be heated to 600° to 700° C. The disadvantage in the case of this process is the addition of foreign ions.

SUMMARY OF THE INVENTION

It is an object of the invention to provide a process for producing granulated strontium carbonate in a technically simple manner while avoiding the disadvantages of the prior art.

It is another object of the invention to provide a process which can be carried out in such a manner that the strontium carbonate product will be free of inorganic refractory material.

These and other objects of the invention are achieved by providing a process for producing granulated strontium carbonate comprising the steps of mixing strontium carbonate with a binder selected from the group consisting of strontium oxide, strontium hydroxide, and hydrated strontium hydroxide in the presence of water, and granulating and drying the resulting mixture.

DETAILED DESCRIPTION OF PREFERRED EMBODIMENTS

The process according to the invention for producing granulated strontium carbonate, in which fine-particle strontium carbonate is mixed with an additive in the presence of water and the mixture is dried in a granulating manner, is characterized in that a binder from the group comprising strontium oxide, strontium hydroxide and hydrated strontium hydroxide is used as the additive.

If desired, additional binders may also be used, for example, in such a manner that a portion of the strontium hydroxide, preferably less than 50 wt-%, particularly less than 15 wt-%, is replaced by other binders, for example, by caustic alkalis, such as sodium hydroxide, by water-soluble silicates, particularly potassium water glass, by silicic acid esters, by natural or synthetic organic oligomers or polymers, such as dextrin, sodium polyacrylate, for example, the commercial articles "Sokalan" PA20™, PA25™ or PA30™ or polyvinyl alcohol, such as "Moviol" 4–88™ of Hoechst Co. Starch, native potato starch, dextrin, cold-soluble potato starch or cold-soluble wheat starch is also suitable. In the case of this embodiment, the proportion of foreign ions is at least reduced considerably. However, preferably the aforementioned strontium compounds are used as the sole binder.

The preferred starting material is a fine-particle $SrCO_3$ of a mean particle size of from 0.5 to 10 $\mu$m.

According to a preferred embodiment, the process is carried out in such a manner that the material to be granulated or the granulated material does not come in contact with inorganic refractory materials in any of the process steps, either during the granulating or during the drying. In this variant, a particularly pure strontium carbonate is obtained which is free of inorganic refractory materials.

The amount of binder, calculated as $Sr(OH)_2 \cdot 8H_2O$, may vary depending on the desired degree of hardness of the granulates, for example, between 1.5 and 10 wt-%, calculated as $Sr(OH)_2 \cdot 8H_2O$. Particularly good granulates are obtained when the binder, calculated as $Sr(OH)_2 \cdot 8H_2O$, is used in an amount of from 1.8 to 4 wt-%, preferably 1.8 to 3 wt-% relative to the dry mass of the strontium carbonate used. This particularly preferred range corresponds, for example, to an addition of approximately 0.8 to 1.4 wt-% of anhydrous $St(OH)_2$.

A preferred binder is strontium hydroxide or strontium hydroxide octahydrate.

The amount of water may range from 0.5 to 50 wt-% relative to the total weight of the mixture. Different possibilities exist for introducing the water into the mixture. A filter-moist strontium carbonate cake from the strontium carbonate precipitation may, for example, be used. As an alternative, dried strontium carbonate or the binder may be slurried with water. The binder is preferably used in the form of an aqueous preparation, for example, with 30 to 80 wt-% of the binder in water.

According to a particularly simple embodiment of the invention, the mixture is first dried and then broken up into small pieces. Within the scope of the present invention, the term "drying" means that the mixture is heated to at least such a temperature that fine particles of the strontium carbonate adhere to one another and form agglomerates. According to experiences, the temperature required for this purpose is at least 350° C. Drying preferably takes place in the range of from 400° to 600° C., particularly from 400° to 500° C. It is possible to dry at still higher temperatures of up to 750° C. or more, however, this offers no advantages and there is even the risk that, at such high temperatures, foreign ions may contaminate the granulates.

The drying in the case of the above-described particularly simple embodiment may in principle take place in any suitable vessel, for example, in rotary furnaces or in brick furnaces. In this case, there is the risk that inorganic refractory material may be incorporated in the granulates. To produce granulates which are free of inorganic refractory material, it is advantageous to use drying devices which are constructed of metal, for example, of carbon steel, inox steel, of monel metal, special steel or other alloys resistant to carbonate. The dried material will then be reduced in size or granulated in conventional mills and, if desired, may also be separated into fractions by means of sieves. Normally, the reduction takes place to particles of a size of from 0.1 to 1.5 mm, preferably 0.1 to 1 mm. Naturally, the reduction may also take place to other particle sizes.

According to another embodiment, the mixture is first granulated and then dried. The granulating step may be carried out using known processes and known equipment. Thus a rolling granulation, a mixing granulation or a compacting granulation may be used. Spray mixing drums, trough screw mixers, roller presses and especially granulating drums, granulating plates and granulating mixers as well as plate mixers are very suitable. High-speed mixers, such as the "Recycler CB" high-speed mixer of Loedige Co. or granulating plates or mixing granulating devices, for example, the plough blade mixers by the same firm, are particularly suitable.

The drying takes place in conventional drying equipment, preferably equipment that is not lined with inorganic refractory material. Rotary furnaces, drum dryers or fluidized-bed dryers, particularly those made of the above-mentioned metals, are particularly suitable.

The amount of water may vary depending on the granulating device which is used. When a high-speed mixer or a mixing granulating apparatus, such as a plough blade mixer, is used, for example, the water content may be quite high and may amount, for example, to up to 50 wt-% or more in the mixture. For example, in this case, the still moist filter cake may be used which is obtained during the carbonate precipitation with a subsequent pressing-out the water. When the granulation is carried out in the manner of a rolling granulation, the water content should be less, for example, up to 10 wt-%. The rolling granulation may, for example, be carried out in such a manner that dry carbonate is mixed with the dry binder and the carbonate agglomerates as granulation nuclei and is sprayed in the granulating device with the desired quantity of water or binder solution or binder suspension.

In accordance with another embodiment of the invention, the mixture is granulated and heated at the same time. If the temperature to which the heating takes place is not yet sufficient for the drying in the sense of the invention, the predried material will subsequently be dried again.

The granulation may be effected using conventional equipment. Mechanical granulating apparatuses or apparatus granulating by build-up granulation may be used. For example, heatable granulating drums, granulating plates, pan mixers, spray mixing drums, trough screw mixers or roller presses are suitable. So-called "flash reactors" are also very suitable. In such reactors, the material to be granulated is subjected to a centrifugal acceleration in the space between two heated concentric cylinders which rotate at different speeds. The inner cylinder advantageously has adjustable scrapers which facilitate the removal of the product. The heating takes place, for example, by means of steam, hot air or heat transfer media. Normally, flash reactors are constructed of metal (such as carbon steel, inox steel, of monel or other alloys) and have no ceramic components made of inorganic refractory material. The granulometry and the bulk weight of the desired granulated product may be influenced by varying the relative rotational speeds of the two cylinders as well as by varying the inclination of the scrapers. It is also possible to influence the granulometry and the specific weight of the granulates by varying the heating temperature in the cylinders. In the commercially available flash reactors, the temperature may be regulated, for example, within a range of from 100° to 400° C. Relatively dry material as well as aqueous material may be used.

If the material was only subjected to a predrying, for example, at a temperature of up to 100° or 300° C., another drying is carried out during which the material is heated to temperatures all the way to the sintering temperature, preferably 400° to 600° C. Suitable dryers are described above. Dryers are preferably used which are not lined with inorganic refractory material. Drum dryers or fluidized-bed dryers, for example, are very suitable.

If desired, the resulting granulates may be reduced in size again (e.g. crushed) and may be screened to the desired final particle size. The fine-grained portion may be recycled.

The invention also relates to granulated strontium produced by the process of the invention. This granulated strontium carbonate is preferably free of added foreign ions and contains strontium compounds as the only binder. In accordance with a preferred embodiment, it is characterized by the absence of inorganic refractory material. Preferred strontium carbonate according to the invention can be obtained by adding strontium hydroxide, calculated as $Sr(OH)_2 \cdot 8H_2O$, in the range of from 1.8 to 4 wt-%, relative to the existing strontium carbonate- The particle size is in the range of from 0.1 to 1.5 mm, preferably below 1 mm. In this case, it should be noted that the used fine-particle strontium carbonate can still be detected in the granulates. As used herein the term "fine-particle" refers to material having an average particle size of from 0.5 to 10 $\mu$m. The granulates according to the invention may have a bulk density in the range of, for example, from 0.9 to 1.3 $kg/dm^3$ The invention further relates to the use of granulated strontium carbonate according to the invention in the glass industry, for example, in manufacturing of front plates for video screens and other special glass types where it is critical that the glass be free of alkali. However, the granulates according to the invention may also be used for other purposes in which alkaline earth metal carbonates are normally used, particularly if they are essentially free of alkali and inorganic refractory materials.

The process according to the invention permits the production of strontium carbonate in a technically simple manner. Energy-saving operation is facilitated, and the introduction of foreign ions is avoided- The bulk pouring behavior of the granulates according to the invention, which exhibit sufficient hardness, is very good. It is particularly advantageous that, because of the low drying temperature, strontium carbonate can also be produced which is free of inorganic refractory material and coloring oxides.

The following examples are intended to illustrate the invention in further detail without limiting its scope.

EXAMPLE 1:

Granulation of an Aqueous Suspension of Strontium Carbonate Using Strontium Hydroxide Octahydrate as Binder.

The product produced during carbonization was used as the strontium carbonate source together with 31.3 wt-% water. 437 g of this "dough" were used. 6 g strontium hydroxide octahydrate were slurried with 10 ml water, were then added to the "dough", and the mixture was homogenized. The mixture was then calcined for 30 minutes in a furnace at 500 ° C. After cooling, the product was crushed to particles of a size of from 0.1 to 1 mm. Firm granulates were obtained.

EXAMPLE 2:

Granulation of Dry Strontium Carbonate.

One gram of anhydrous strontium hydroxide was slurried with approximately 0,7 ml water to give 1.7 g of a suspension with a solids content of 60 wt-%. The suspension was added to 100 g of dry powdery strontium carbonate and was homogenized. The preparation was then sintered for 30 minutes at 400° to 500° C. and subsequently granulated. Hard granulates were obtained.

EXAMPLES 3 to 5:

Production of Strontium Carbonate Granulates Using Anhydrous Strontium Hydroxide, Strontium Hydroxide Octahydrate at Various Temperatures.

The procedure was analogous to Example 1. In each case the duration of the heat treatment was 30 minutes. The amounts of additives used (in each case relative to the dry mass of strontium carbonate used), the type of additives, the heat treatment, and an analysis of the hardness of the granulates are compiled in Table 1.

TABLE 1

| Example | Additive Amount (wt-%) | Treatment Temperature | Evaluation |
|---|---|---|---|
| 3 | 2% $Sr(OH)_2 \cdot 8H_2O$ | 500° C. | good hardness |
| 4 | 3% $Sr(OH)_2 \cdot 8H_2O$ | 500° C. | good hardness |
| 5 | 1% $Sr(OH)_2$ | 400–500° C. | very good hardness |

Despite the low sintering temperature, very hard granulates were obtained which were free of discoloration. The low sintering temperature enabled the use of drying apparatus which was not lined with refractory brick. Consequently, a product was obtained which was free of inorganic refractory material.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing granulated strontium carbonate comprising the steps of:
   mixing strontium carbonate with a binder selected from the group consisting of strontium oxide, strontium hydroxide, and hydrated strontium hydroxide in the presence of water, and
   granulating and drying the resulting mixture.

2. A process according to claim 1, wherein said strontium carbonate is maintained free of contact with inorganic refractory material during said granulating and drying.

3. A process according to claim 1, wherein said strontium carbonate is mixed with an amount of binder equivalent to from 1.8 to 4 wt-% Sr(OH)2-octahydrate, relative to the dry mass of the strontium carbonate.

4. A process according to claim 1, wherein said binder is strontium-hydroxide or strontium hydroxide octahydrate.

5. A process according to claim 1, wherein said mixture contains from 0.5 to 50 wt-% water, relative to the total weight of the mixture.

6. A process according to claim 1, further comprising the step of crushing the dried mixture.

7. A process according to claim 1, wherein said mixture is initially granulated and then dried.

8. A process according to claim 7, wherein said granulating is carried out in a high-speed mixer, a granulating mixer or on a granulating plate.

9. A process according to claim 1, wherein the mixture is granulated and predried and then dried.

10. A process according to claim 9, wherein the granulating and predrying are effected simultaneously in a flash drier.

11. A process according to claim 9, wherein the drying is effected in a drum drier or in a fluidized-bed drier.

12. A process according to claim 1, wherein the drying is effected at a temperature of from 400° to 600 ° C.

13. Granulated strontium carbonate produced by the process of claim 1.

14. Granulated strontium carbonate according to claim 13, free of inorganic refractory material.

15. Granulated strontium carbonate according to claim 13, free of added foreign ions.

16. A process for producing glass comprising melting a glass-forming mixture, wherein said glass-forming mixture comprises granulated strontium carbonate according to claim 13.

* * * * *